US006585783B1

(12) United States Patent
Matthäi et al.

(10) Patent No.: US 6,585,783 B1
(45) Date of Patent: Jul. 1, 2003

(54) CANDLE BASE MATERIAL AND METHOD FOR PRODUCING A CANDLE BASE MATERIAL

(75) Inventors: Michael Matthäi, Henstedt-Ulzburg (DE); Gernot Meyer, Rosengarten (DE); Bernd Laudi, Seevetal (DE)

(73) Assignee: Schümann Sasol GmbH, Hamburg (DE)

( * ) Notice: Subject to any disclaimer, the term of this patent is extended or adjusted under 35 U.S.C. 154(b) by 0 days.

(21) Appl. No.: 09/554,858

(22) PCT Filed: Nov. 16, 1998

(86) PCT No.: PCT/EP98/07300

§ 371 (c)(1), (2), (4) Date: Jul. 31, 2000

(87) PCT Pub. No.: WO99/27042

PCT Pub. Date: Jun. 3, 1999

(30) Foreign Application Priority Data

Nov. 20, 1997 (DE) ........................................ 197 51 351

(51) Int. Cl.[7] .......................... C11C 5/00; B29D 31/00; A47G 35/00

(52) U.S. Cl. ....................... 44/275; 425/803; 428/542.2

(58) Field of Search ................................ 424/400, 484, 424/501, 502, 489; 514/789; 44/275; 425/803; 428/542.2

(56) References Cited

U.S. PATENT DOCUMENTS

| | | | | | |
|---|---|---|---|---|---|
| 3,819,342 | A | | 6/1974 | Gunderman et al. | |
| 3,857,805 | A | | 12/1974 | Prickril | |
| 4,083,731 | A | * | 4/1978 | Brotz et al. | 106/270 |
| 5,132,355 | A | | 7/1992 | Nahlovsky | |
| 5,578,089 | A | * | 11/1996 | Elsamaloty | 44/275 |
| 5,879,694 | A | * | 3/1999 | Morrison et al. | 424/405 |
| 6,111,055 | A | * | 8/2000 | Berger et al. | 528/310 |

FOREIGN PATENT DOCUMENTS

| | | |
|---|---|---|
| WO | 9634077 | 10/1996 |
| WO | 9708282 | 3/1997 |
| WO | 9817243 | 4/1998 |

OTHER PUBLICATIONS

Database WPI Section Ch, Week 7945, Derwent Publications Ltd., London, GB; Class A17, An 79–81258B XP002097193.

* cited by examiner

*Primary Examiner*—Thurman K. Page
*Assistant Examiner*—Humera N. Sheikh
(74) *Attorney, Agent, or Firm*—Martin A. Farber

(57) ABSTRACT

The invention relates to a candle base material having components that allow the candle to change from opaque to transparent at a desired temperature.

18 Claims, No Drawings

CANDLE BASE MATERIAL AND METHOD FOR PRODUCING A CANDLE BASE MATERIAL

FIELD AND BACKGROUND OF THE INVENTION

The invention relates firstly to a candle base material, as used for producing a candle with a see-through, transparent candle body, where the candle body has white oil and a copolymer as some of its constituents.

These types of candle base materials and, respectively, of candles produced therefrom are already known in a variety of embodiments. Reference is made, for example, to WO 96/34077 and WO 97/08282. The base materials for candles and, respectively, the candles produced therefrom which are known from these documents have a clear, transparent candle body.

SUMMARY OF THE INVENTION

The invention concerns the technical problem of finding an improvement for a base material of this type for candles and, respectively, a candle produced therefrom.

This technical problem is first and foremost solved by the invention the subject-matter of claim 1, which provides that the candle base material comprises, besides a white oil—an oil also termed hydrocarbon oil in the literature—also synthetic paraffins in the chain length range from C18 to C20. In this way, it is achieved firstly that the candle is relatively closely related to conventional paraffin candles. Surprisingly, however, it is also achieved that a changeover from transparent to opaque and vice versa appears, the changeover being reversible and depending on a particular temperature, the change temperature. As long as the temperature of the candle base material and, respectively, of the candle is lower than the change temperature, the candle base material or, respectively, the candle body produced therefrom is opaque. Once this temperature is exceeded, a transition state is followed by the appearance of a substantially completely clear, transparent candle base material or, respectively, a candle of this type. This can be advantageous in a variety of respects. The candle may also serve as a temperature indicator. Secondly, when the candle burns in a relatively cool environment, a changeover from opaque to transparent, moving in the direction of the region of burning, can be observed to become established. This is moreover associated with corresponding optical effects. The characteristics of the candle body correspond to those of a conventional paraffin candle. It is also in particular self-supporting, and this also applies when sufficient of the paraffins mentioned have been added. On the other hand, the candle may also be formed by placing the candle base material for example in a receptacle. A wick passes through the centre of the candle body in conventional manner.

The addition of the copolymers mentioned is also significant for the structure of the candle body by Specifically, use may be made here of a variety of polymers. Examples of these are diblock, triblock, radial-block and multiblock copolymers. It is particularly preferable to use a copolymer known as “Kraton G”. This is a thermoplastic rubber. If the candle body is not solid, it has a gel-like structure.

The composition of the candle base material may vary very widely within the general teaching of the present application.

It is significant that the composition comprises a proportion of white oil and of the synthetic paraffins mentioned in the range from about 60 to 95%. Depending on how large a proportion of this is made up by the synthetic paraffins, there is a shift in the change temperature. The higher the proportion of the synthetic paraffins, the higher the change temperature. If the proportions are approximately equally weighted, i.e. in each case about 50%, the change temperature is about 20° C. If the proportion of the synthetic paraffins is about 90%, the changeover temperature is about 30° C. If the proportion of the synthetic paraffins is about 10%, the change temperature is about 6° C.

Besides the synthetic paraffins mentioned, other substances, individually or in combinations, may also have been added to the candle base material. These are in particular poly-alpha-olefins, low-melting point paraffin fractions and products which have been obtained from naturally occurring fats and oils and have been prepared by a chemical modification process, such as for example butyl stearate. The poly-alpha-olefins may also have been provided in place of the synthetic paraffins mentioned. The same applies to low-melting point paraffin fractions and to the products which have been obtained from the naturally occurring fats and oils mentioned and have been prepared by a chemical modification process. Examples of these are stearic acid butyl ester, lauric acid methyl ester (tradename Edenor MEC 12 98/100) and triglycerides of caprylic acid (Myritol 312). Besides these synthetic products, it is also possible to use naturally occurring fats and oils (e.g. coconut oil).

The invention also provides a process for preparing a candle base material for a candle with a transparent candle body. To arrive at novel effects here with regard to the candle body, the invention proposes that a temperature-dependent change between opacity and transparency of the candle body is established by adding synthetic paraffin in the C18 to C20 chain range and/or one or more of the abovementioned other substances. In particular, it is preferred that the candle body is composed of from about 60 to 95% of a mixture made from white oil and synthetic paraffin in the chain length range mentioned, and that a relatively high change temperature is established by increasing or reducing the proportion mentioned of the paraffin, starting from a change temperature of about 20° C. with equal proportions of the synthetic paraffin and of the white oil in the mixture.

DETAILED DESCRIPTION OF THE PREFERRED EMBODIMENT

Some examples of compositions of the candle base material are described below.

Example 1

44.5% of white oil 44.5% of C18–C20 synthetic paraffin 6.0% of Kraton G 1650

5.0% of butyl stearate

A candle base material of this type has the following properties: at a temperature of about 10° C., it is paraffinically opaque and solid. About 18° C., a change begins from opacity to transparency. At about 20° C., the transparent candle base material becomes a clear candle base material.

Example 2

50% of white oil (OOW 065)

43% of poly-alpha-olefins

7% of Kraton G 1650

This candle base material has properties identical with those described above, except that the change from opacity to transparency and finally to a clear material does not start to occur until about 23° C.

Example 3

50% of white oil (OOW 065)

33% of poly-alpha-olefins

10% of butyl stearate

7% of Kraton G 1650

The resultant properties are again substantially identical, except that in this case the change from opacity via transparency to clarity takes place in the temperature region of 10° C.

Example 4

40% of white oil (OOW 065)

10% of C18–C20

33% of poly-alpha-olefins

10% of butyl stearate

7% of Kraton G 1650

The resultant properties are practically identical to those of the candle base material described above under 3.

Example 5

40% of white oil (OOW 065)

53% of low-melting point paraffin fraction

7% of Kraton G 1650

A change from opacity via transparency to clarity results at about +30° C. here.

Example 6

65% of white oil OOW 065

10% of C18–C20

19% of Myritol 312

6% of Kraton

A change from opacity via transparency to clarity results at about 10° C. here.

Example 7

65% of white oil OOW 065

15% of butyl stearate

10% of C18/C20

8% of Kraton G 1650

We claim:

1. Candle base material for producing a candle with a candle body, the candle base material being partially composed of white oil and of a copolymer, wherein the candle base material has synthetic paraffin of chain length C18 to C20 as another constituent wherein the components of the candle are provided in amounts whereby the candle is able to change from opaque to transparent at a desired temperature.

2. Candle base material according to claim 1, wherein the candle base material has poly-alpha-olefins as a further constituent.

3. Candle based material according to claim 1, wherein the candle base material has paraffin fractions including at least one of stearic acid butyl-ester, lauric acid methyl ester and triglycerides of caprylic acid as a further constituent.

4. Candle based material according to claim 1, wherein the candle base material has a further constituent products obtained from naturally occurring fats and oils and prepared by chemical modification processes.

5. Candle base material according to claim 1, wherein the copolymer is selected from the group consisting of diblock, triblock, radial-block and multiblock copolymer, and wherein the temperature-dependent change between opacity and clear transparency is reversible.

6. Process for preparing a candle base material for a candle with a transparent candle body, comprising the steps of:

partially composing the candle base material of white oil and of a copolymer, and establishing a temperature-dependent change between opacity and clear transparency of the candle body by adding synthetic paraffins in a range of chain lengths from C18–C20 in amounts suitable for enabling the candle to change from opaque to transparent at a desired temperature.

7. Process according to claim 6, wherein a temperature-dependent change between opacity and clear transparency of the candle body is established by adding poly-alpha-paraffins.

8. Process according to claim 6, further comprising the step of adding paraffin fractions including at least one of stearic acid butyl ester, lauric acid methyl ester and triglycerides of caprylic acid to the candle base material as a further constituent.

9. Process according to claim 6, further comprising the step of adding to the candle base material constituent products obtained from naturally occurring fats and oils and prepared by chemical modification processes.

10. Process according to claim 6, wherein the mixture of the white oil and synthetic paraffins is within 60 to 95% of the candle base material and a change temperature is established by increasing or reducing the proportion of synthetic paraffin in the mixture.

11. Process according to claim 10, further comprising the step of setting the change temperature at about 20° C. by using approximately equivalent proportions of the white oil and of the synthetic paraffins.

12. Process according to claim 6, further comprising the step of selecting the copolymer from the group consisting of-diblock, triblock, radial-block and multiblock copolymer, and wherein the temperature-dependent change between opacity and clear transparency is reversible.

13. Candle base material for producing a candle with a candle body, the candle base material consisting essentially of white oil and a copolymer, wherein the candle base material has synthetic paraffin of chain length C18 to C20 as another constituent, and wherein the components of the candle are provided in amounts whereby the candle is able to change from opaque to transparent at a desired temperature.

14. Candle base material for producing a candle with a candle body according to claim 1, wherein said white oil and said synthetic paraffin together constitute a portion of the total weight of the base material in the candle body in a range of 60–95% by weight %.

15. Candle base material for producing a candle with a candle body according to claim 14, wherein the white oil and the synthetic paraffin may be present in equal parts, or wherein the amount of one of the white oil and the synthetic paraffin may be up to several times greater than the other of the white oil and the synthetic paraffin.

16. Candle base material for producing a candle with a candle body, the candle base material being partially composed of white oil and of a copolymer, wherein the candle base material has synthetic paraffin of chain length C18 to C20 as another constituent, wherein the components of the candle are provided in amounts whereby the candle is able to change from opaque to transparent which change is reversible and is temperature dependent.

17. Candle base material for producing a candle with a candle body, the candle base material being partially composed of white oil and of a copolymer, wherein the candle base material has synthetic paraffin of chain length C18 to C20 as another constituent to establish a temperature-dependent change between opacity and clear transparency of the candle body at a change temperature lying within a temperature range of 10 degrees to 30 degrees centigrade, the magnitude of the change temperature being dependent on the concentration of the synthetic paraffin.

18. Process for preparing a candle base material for a candle with a transparent candle body, comprising the steps of:

partially composing the candle base material of white oil and of a copolymer, and establishing a temperature-dependent change between opacity and clear transparency of the candle body by adding synthetic paraffins in a range of chain lengths from C18–C20, the temperature-dependent change occurring at a change temperature lying within a temperature range of 10 degrees to 30 degrees centigrade, the magnitude of the change temperature being dependent on the concentration of the synthetic paraffins.

* * * * *